United States Patent
Han et al.

(10) Patent No.: US 10,652,474 B2
(45) Date of Patent: May 12, 2020

(54) METHOD FOR ADJUSTING AN ANGLE OF AN ELEMENT OF A PHOTOGRAPHING UNIT AND A HEAD MOUNTED DISPLAY

(71) Applicant: SHENZHEN ROYOLE TECHNOLOGIES CO. LTD., Shenzhen, Guangdong (CN)

(72) Inventors: Chao Han, Guangdong (CN); Hongyan Shi, Guangdong (CN)

(73) Assignee: SHENZHEN ROYOLE TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/074,422

(22) PCT Filed: Jun. 30, 2016

(86) PCT No.: PCT/CN2016/087847
§ 371 (c)(1),
(2) Date: Jul. 31, 2018

(87) PCT Pub. No.: WO2018/000304
PCT Pub. Date: Jan. 4, 2018

(65) Prior Publication Data
US 2019/0037144 A1    Jan. 31, 2019

(51) Int. Cl.
*G09G 5/00* (2006.01)
*H04N 7/18* (2006.01)
(Continued)

(52) U.S. Cl.
CPC .......... *H04N 5/23296* (2013.01); *G02B 5/30* (2013.01); *G02B 27/01* (2013.01); *G02B 27/017* (2013.01);
(Continued)

(58) Field of Classification Search
CPC ...... H04N 7/18; H04N 5/232; H04N 5/23296; G09G 5/00
(Continued)

(56) References Cited

U.S. PATENT DOCUMENTS 5,841,409 A    11/1998  Ishibashi et al.
9,411,160 B2 *  8/2016  Hosoya ............... G02B 27/017
(Continued)

FOREIGN PATENT DOCUMENTS

| CN | 201383846 Y | 1/2010 |
| CN | 103384308 A | 11/2013 |
| CN | 103984097 A | 8/2014 |

OTHER PUBLICATIONS

International search report dated Mar. 29, 2017 from corresponding application No. PCT/CN2016/087847.

*Primary Examiner* — Trang U Tran
(74) *Attorney, Agent, or Firm* — Hauptman Ham, LLP

(57) ABSTRACT

A method for adjusting the angle of an element of a photographing unit of a head mounted display is provided by the present disclosure, including determining a rotation angle of a user's head when the user's head rotates, and adjusting an angle of the element of the photographing unit of the head mounted display according to the rotation angle, to align a photographing lens with a specific subject. A head mounted display is provided by the present disclosure, thus automatically capturing a photographing scene may be realized.

14 Claims, 3 Drawing Sheets

(51) Int. Cl.
    *H04N 5/232*    (2006.01)
    *G02B 27/01*    (2006.01)
    *G02B 5/30*     (2006.01)

(52) U.S. Cl.
    CPC ..... *G02B 27/0172* (2013.01); *H04N 5/23258* (2013.01); *H04N 5/23287* (2013.01); *H04N 5/23299* (2018.08); *G02B 2027/0138* (2013.01); *G02B 2027/0187* (2013.01)

(58) Field of Classification Search
    USPC .................................. 345/8, 7; 348/169, 158
    See application file for complete search history.

(56) References Cited

U.S. PATENT DOCUMENTS

| | | | |
|---|---|---|---|
| 9,477,085 B2* | 10/2016 | Kim | G02B 27/0172 |
| 10,269,132 B2* | 4/2019 | Kawamoto | B64C 39/02 |
| 2002/0075201 A1* | 6/2002 | Sauer | G02B 27/017 |
| | | | 345/7 |
| 2010/0259619 A1 | 10/2010 | Nicholson | |

* cited by examiner

METHOD FOR ADJUSTING AN ANGLE OF AN ELEMENT OF A PHOTOGRAPHING UNIT AND A HEAD MOUNTED DISPLAY

RELATED APPLICATIONS

The present application is a National Phase of International Application Number PCT/CN2016/087847, filed Jun. 30, 2016.

TECHNICAL FIELD

The present disclosure relates to a technical field of a head mounted display, more particularly to a method for adjusting an angle of an element of a photographing unit and a head mounted display.

BACKGROUND

A Head mounted display (HMD) is configured as a display device that can be worn on a head. In order to enable a user to see an actual scene during wearing the HMD, a camera is usually integrated into the HMD, thus the user may view the actual scene by the camera.

Currently, a photographing angle of the HMD is fixed. In the photographing process, when the user's head rotates to drive the camera to rotate, a photographing line may be moved. If the user wants to stably photograph a person/object for a long time, it should take a long time to remain a fixed head posture, thus causing the user to feel tired and uncomfortable, and thereby degrading the user experience.

SUMMARY

An exemplary embodiment of the present disclosure provides a method for adjusting an angle of an element of a photographing unit of a head mounted display and a head mounted display, to provide a scheme for automatically capturing a photographing scene.

In a first aspect, an exemplary embodiment of the present disclosure provides a method for adjusting an angle of an element of a photographing unit of a head mounted display, including:
determining a rotation angle of a user's head when the user's head rotates; and
adjusting an angle of the element of the photographing unit of the head mounted display according to the rotation angle, to align a photographing lens with a subject.

In a second aspect, one exemplary embodiment of the present disclosure provides a head mounted display, including:
a photographing unit including a plurality of elements;
an angle determining unit operated to determine a rotation angle of a user's head when the user's head rotates; and
a first adjusting unit operated to adjust an angle of one or more the elements according to the rotation angle, to align a photographing lens with a specific subject.

In a third aspect, another exemplary embodiment of the present disclosure provides a head mounted display, including a processor, a memory, a photographing unit, and a gyroscope for detecting an angle, and the processor is operated to perform the method described in the first aspect.

The head mounted display provided by the present disclosure determines a rotation angle of a user's head when the user's head rotates, and then adjusts an angle of an element of a photographing unit of the head mounted display according to the rotation angle, thus automatically capturing a photographing scene may be realized.

BRIEF DESCRIPTION OF THE DRAWINGS

In order to more clearly illustrate the technical solution of the present disclosure, the accompanying drawings required for describing the embodiments will be briefly described below. Apparently, the accompanying drawings in the following description are merely the embodiments of the present disclosure, and other drawings may be obtained by those skilled in the art according to these accompanying drawings without paying any creative labor.

DETAILED DESCRIPTION

In order to make those skilled in the art better understand the solutions of the present disclosure, the technical solutions in the embodiments of the present disclosure are clearly and completely described below with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

The details will be described correspondingly below.

The terms "first", "second", "third", "fourth", and the like in the specification and claims of the present disclosure and the drawings are operated to distinguish different objects and not to describe a specific order.

Figure 1:
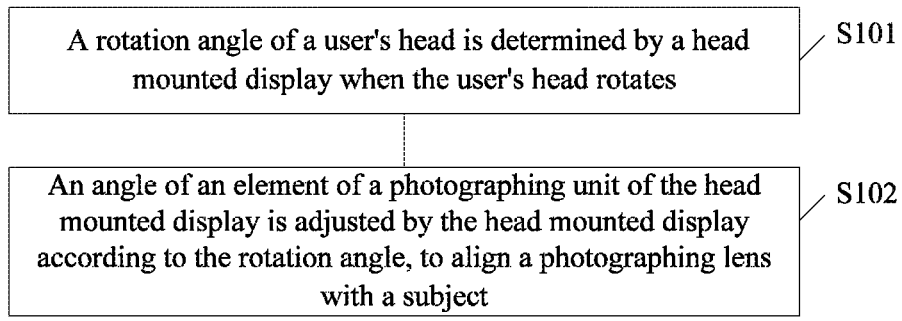
FIG. 1 is a flowchart of a method for adjusting an angle of an element of a photographing unit of a head mounted display provided by a first exemplary embodiment of the present disclosure.

As illustrated in FIG. 1, FIG. 1 is a block diagram of a method for adjusting an angle of an element of a photographing unit of a head mounted display provided by a first exemplary embodiment of the present disclosure, and the method includes the following processes.

At block S101, a rotation angle of a user's head is determined by a head mounted display when the user's head rotates.

At block S102, an angle of an element of a photographing unit of the head mounted display is adjusted by the head mounted display according to the rotation angle, to align a photographing lens with a subject.

In detail, the element of the photographing unit of the head mounted display of the present disclosure can be rotatable. The head mounted display determines the rotation angle of the user's head when the user's head rotates. The head mounted display adjusts the angle of the element of the photographing unit of the head mounted display according to the rotation angle, to align a photographing lens with a subject. It can be seen that, when the user's head rotates to drive the photographing unit to rotate, the element of the photographing unit is adjusted to make a subject to be always within the range of sight, thus achieving an effect that the head mounted display automatically capturing a photographing scene, and thereby improving the user experience.

Furthermore, the method further includes the following process.

An initial parameter of the element of the photographing unit is recorded by the head mounted display when a photographing tracking mode is initiated. The specific implementation of the process at S102 includes that the angle of the element of the photographing unit is adjusted by the head mounted display according to the initial parameter of the element of the photographing unit and the rotation angle.

For example, the head mounted display provided by the present disclosure includes a photographing tracking mode and an ordinary photographing mode. When the photographing tracking mode is initiated by a user, the initial parameter of the element of the photographing unit is recorded by the head mounted display firstly. Then when the user's head rotates, the angle of the element of the photographing unit is adjusted by the head mounted display according to the initial parameter of the element of the photographing unit and the rotation angle of the user's head.

The photographing unit includes a rotatable lens unit, a polarize lens, and an image sensor (e.g. charge coupled device, CCD). The initial parameter of the element of the photographing unit includes at least one selected from a group consisting of an initial angle of the rotatable lens unit, an initial angle of an optical axis of the photographing unit, an initial position of the subject, and a characteristic of the subject.

It is to be noted that, when the photographing tracking mode is initiated, the element of the photographing unit is initialized by the head mounted display (that is, the angle of the element of the photographing unit is restored to the initial angle of which the photographing system is designed). Therefore, each time the photographing tracking mode is initiated, the initial angle of the rotatable lens unit, the initial angle of the polarize lens, and the initial angle of the optical axis of the photographing unit recorded by the head mounted display may be the initial angle of which the photographing system is designed.

Furthermore, the element of the photographing unit includes a rotatable lens unit and a polarize lens. The initial parameter of the element of the photographing unit includes an initial angle of the rotatable lens unit and an initial angle of the polarize lens. The specific implementation that the angle of the element of the photographing unit is adjusted by the head mounted display according to the initial parameter of the element of the photographing unit and the rotation angle, includes that the head mounted display rotates the rotatable lens unit at the rotation angle to the direction of the initial angle of the rotatable lens unit, and rotates the polarize lens at half of the rotation angle to the direction of the initial angle of the polarize lens.

Figure 2:
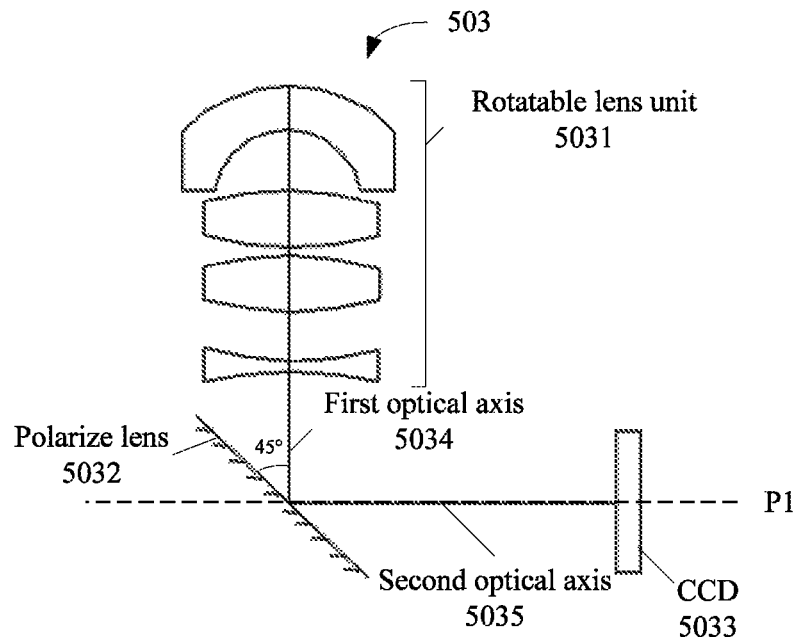
FIG. 2 is a structural schematic view of the photographing unit of the head mounted display of FIG. 1.

For example, as illustrated in FIG. 2, FIG. 2 is a structural schematic view of a photographing unit 503 of the head mounted display provided by the present disclosure. A structure illustrated in FIG. 2 is assumed to be an initial structure of the photographing unit 503 when the photographing system is designed. The photographing unit 503 includes a rotatable lens unit 5031, a polarize lens 5032, and an image sensor (e.g. CCD) 5033. The photographing unit 503 further includes a first optical axis 5034 and a second optical axis 5035 perpendicular to the first optical axis 5034. Both of the first optical axis 5034 and the second optical axis 5035 are a path of light within the photographing unit 503. An angle of the first optical axis 5034 is 90°. An angle of the second optical axis 5035 is 0°. The initial angle of the rotatable lens unit 5031 is 90°. The initial angle of the polarize lens 5032 is 135°. The above angles refer to an angle of an axis of the length of each element (that is the rotatable lens unit 5031, the polarize lens 5032, the CCD 5033, the first optical axis 5034, or the second optical axis 5035) relative to an axis P1 in a plane of the photographing unit 503. When the rotation degree of the user's head is 10 degrees (10°), the head mounted display rotates the rotatable lens unit 5031 at 10° to the direction of the initial angle of the rotatable lens unit 5031, and rotates the polarize lens 5032 at 5° to the direction of the initial angle of the polarize lens 5032.

Furthermore, the initial parameter of the element of the photographing unit includes an initial position of the subject and a characteristic of the subject. Prior to perform the process at block S101, the method further includes the flowing processes.

The head mounted display determines whether the position of the subject is changed according to the initial position of the subject and the characteristic of the subject. The head mounted display determines the user's head rotates when the position of the subject is changed, and the process at S101 is performed when the user's head rotates.

Furthermore, the initial parameter of the element of the photographing unit includes an initial angle of an optical axis of the photographing unit. The specific implementation of the process at S102 includes that a current angle of the optical axis is determined by a gyroscope of the head mounted display; the head mounted display determines whether the current angle of the optical axis is consistent with the initial angle of the optical axis; and determines the user's head rotates when the current angle of the optical axis is not consistent with the initial angle of the optical axis.

For example, when the user wears a head mounted display, the user's head rotates to make the head mounted display to rotate, and thereby to drive the photographing unit of the head mounted display to rotate, that is, the optical axis of the photographing unit is changed. Thus, the head mounted display may determine whether the user's head rotates through determining whether the optical axis is changed. The head mounted display detects the current angle of the optical axis of the photographing module by the gyroscope (an angular velocity is acquired by the gyroscope, and the current angle of the optical axis is equal to a time integral of the angular velocity plus the initial angle of the optical axis), and then the current angle of the optical axis is compared with the initial angle. When the current angle is not consistent with the initial angle, the optical axis is changed. That is, the user's head rotates.

Furthermore, the photographing unit further includes an image sensor (e.g. CCD). The initial parameter of the element of the photographing unit comprises an initial position of the subject and a characteristic of the subject. After performing the process at S102, the method further includes the following processes. A target image currently captured by the rotatable lens unit is acquired by the CCD of the head mounted display; a current position of the subject is determined by the head mounted display according to the characteristic of the subject and the target image; and the angle of the element of the photographing unit is adjusted by the head mounted display according to the current position of the subject and the initial position of the subject.

For example, in order to adjust the angle of the element of the photographing unit more accurate, after performing the process at S102, the method further includes the flowing processes. The target image currently captured by the rotatable lens unit is acquired by the CCD of the head mounted display; then the current position of the subject is determined by the head mounted display according to the characteristic of the subject and the target image; and an angle (that is, the angle may be determined by the head mounted display, the initial position and the current position) of the moved subject relative to the initial position is determined by the head mounted display according to the current position of the subject and the initial position of the subject. Then the head mounted display rotates the rotatable lens unit at the rotation angle towards the current position of the subject, and rotates the polarize lens at half of the rotation angle towards the current position of the subject.

Figure 3:
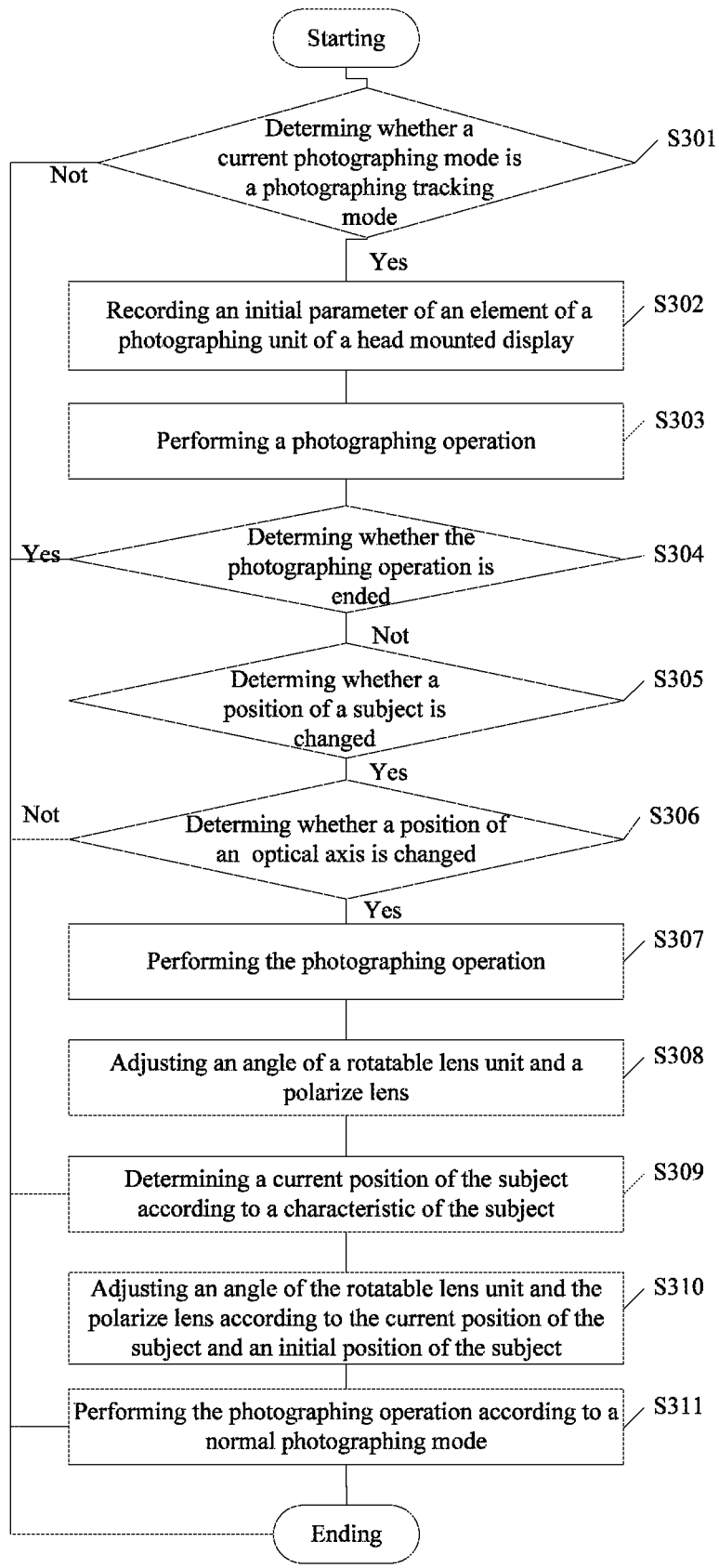
FIG. 3 is a flowchart of a method for adjusting an angle of an element of a photographing unit of a head mounted display provided by a second exemplary embodiment of the present disclosure.

The exemplary embodiment of the present disclosure further provides another more detailed method. As illustrated in FIG. 3, the method further includes the flowing operations.

At block S301, head mounted display determines whether a current photographing mode is a photographing tracking mode.

If yes, proceed to S302.

If not, proceed to S311.

At block S302, an initial parameter of an element of a photographing unit of the head mounted display is recorded by the head mounted display. The initial parameter includes an initial angle of a rotatable lens unit, an initial angle of a polarize lens, an initial angle of an optical axis of the photographing unit, an initial position of the subject, and a characteristic of the subject.

At block S303, the head mounted display performs a photographing operation.

At block S304, the head mounted display determines whether the photographing operation is end.

If yes, proceed to end the photographing operation.

If not, proceed to S305.

At block S305, the head mounted display determines whether a position of the subject is changed.

If yes, proceed to S306.

If not, proceed to do nothing.

At block S306, the head mounted display determines whether a position of an optical axis of the photographing unit is changed.

If yes, proceed to S307.

If not, proceed to S309.

At block S307, the head mounted display determines a rotation angle of the optical axis of the photographing unit. The rotation angle of the optical axis of the photographing unit is equal to a rotation angle of the user's head.

At block S308, the head mounted display rotates the rotatable lens unit at the rotation angle to the direction of an initial angle of the rotatable lens unit, and rotates the polarize lens at half of the rotation angle to the direction of an initial angle of the polarize lens.

At block S309, the head mounted display determines a current position of the subject according to a characteristic of the subject.

At block S310, the head mounted display adjusts an angle of the rotatable lens unit and the polarize lens according to the current position of the subject and an initial position of the subject.

At block S311, the head mounted display performs the photographing operation according to a normal photographing mode.

It is to be noted that the specific implementation process of each step of the method illustrated in FIG. 3 may see the above method, which will not be described herein.

Figure 4:
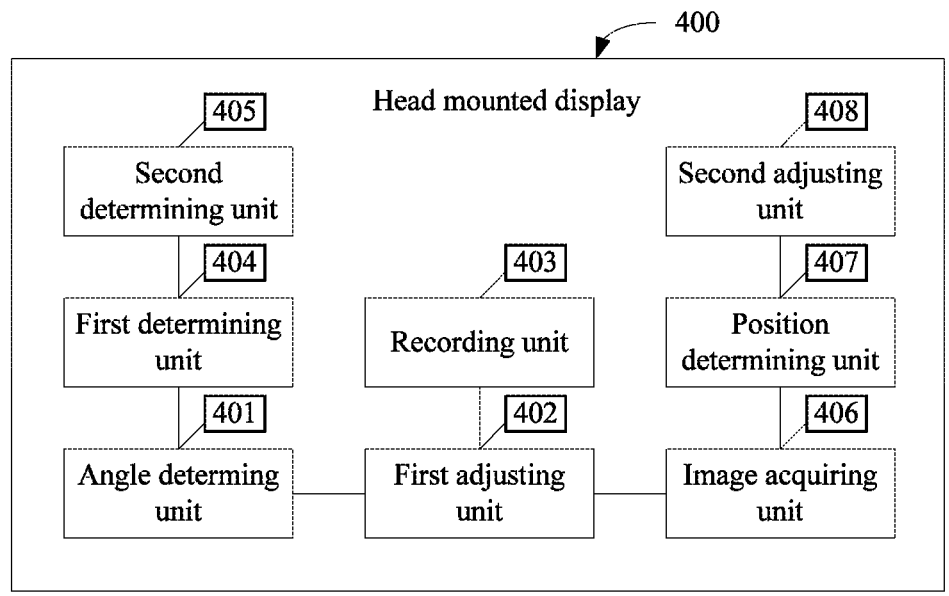
FIG. 4 is a structural schematic view of a head mounted display provided by a first exemplary embodiment of the present disclosure.

An exemplary embodiment of the present disclosure further provides a head mounted display 400, as illustrated in FIG. 4, including:

a photographing unit including a plurality of elements;

an angle determining unit 401 operated to determine a rotation angle of a user's head when the user's head rotates; and a first adjusting unit 402 operated to adjust an angle of one or more the elements according to the rotation angle, to align a photographing lens with a subject.

Furthermore, the head mounted display 400 further includes:

a recording unit 403 operated to record an initial parameter of one or more the elements of the photographing unit when the photographing tracking mode is initiated; and a first adjusting unit 402 specifically operated to adjust the angle of one or more the elements according to the initial parameter of one or more the elements of the photographing unit and the rotation angle.

Furthermore, one or more the elements of the photographing unit include a rotatable lens unit and a polarize lens. The initial parameter one or more of the elements of the photographing unit includes an initial angle of the rotatable lens unit and an initial angle of the polarize lens. The first adjusting unit 402 is specifically operated to rotate the rotatable lens unit at the rotation angle to the direction of the initial angle of the rotatable lens unit, and rotates the polarize lens at half of angle of the rotation angle to the direction of the initial angle of the polarize lens.

Furthermore, the initial parameter one or more of the elements of the photographing unit further includes an initial position of the subject and a characteristic of the subject. The head mounted display 400 further includes a first determining unit 404 and a second determining unit 405. The first determining unit 404 is operated to determine whether a position of the subject is changed according to the initial position of the subject and the characteristic of the subject. The second determining unit 405 is operated to determine whether the user's head rotates when the position of the subject is changed, and determine the rotation angle of the user's head rotates when the user's head rotates.

Furthermore, the initial parameter of one or more the elements of the photographing unit includes an initial angle of an optical axis of the photographing unit. The second determining unit 405 is specifically operated to determine a current angle of the optical axis by a gyroscope of the head mounted display; determine whether the current angle of the optical axis is consistent with the initial angle of the optical axis; and determine the user's head rotates when the current angle of the optical axis is not consistent with the initial angle of the optical axis.

Furthermore, the photographing unit further includes an image sensor (CCD). The initial parameter of one or more the elements of the photographing unit includes an initial position of the subject and a characteristic of the subject. The head mounted display 400 further includes an image acquiring unit 406, a position determining unit 407, and a second adjusting unit 408. The image acquiring unit 406 is operated to acquire a target image currently captured by the rotatable lens unit by the CCD. The position determining unit 407 is operated to determine the current position of the subject according to the characteristic of the subject and the target image. The second adjusting unit 408 is operated to adjust the angle of one or more the elements of the photographing unit according to the current position of the subject and the initial position of the subject.

It is to be noted that the above units (that is the angle determining unit 401, the first adjusting unit 402, the recording unit 403, the first determining unit 404, the second determining unit 405, the image acquiring unit 406, the position determining unit 407, and the second adjusting unit 408) are operated to perform the above operations.

In the embodiment, the head mounted display 400 is presented as units. The "unit" herein may refer to an application-specific integrated circuit (ASIC), a processor executing one or more software or firmware programs, a memory, an integrated logic circuit, and/or other elements that may provide the above functions. In addition, the angle determining unit 401, the first adjusting unit 402, the recording unit 403, the first determining unit 404, the second determining unit 405, the image acquiring unit 406, the position determining unit 407, and the second adjusting unit 408 may be implemented by a processor 501 of a head mounted display illustrated in FIG. 5.

Figure 5:
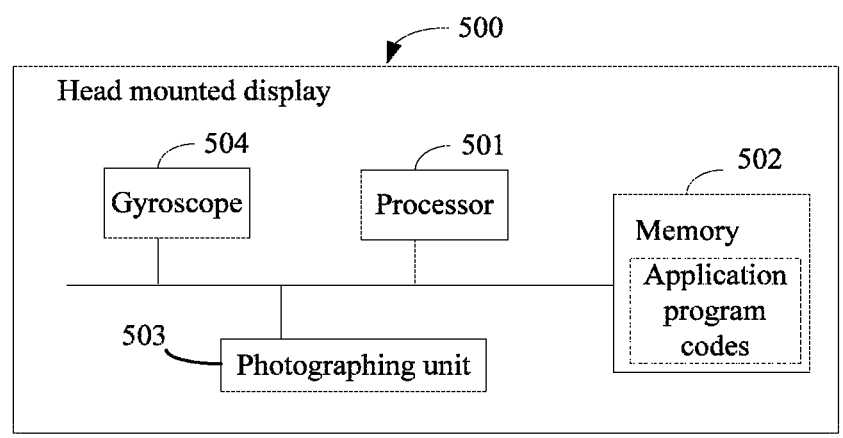
FIG. 5 is a structural schematic view of a head mounted display provided by a second exemplary embodiment of the present disclosure.

As illustrated in FIG. 5, a head mounted display 500 may be implemented by a structure of FIG. 5. The head mounted display 500 includes at least one processor 501, at least one memory 502, a photographing unit 503, and a gyroscope 504. The processor 501, the memory 502, the photographing unit 503, and the gyroscope 504 are connected by a communication bus and in communication with each other.

The processor 501 may be a general-purpose central processing unit (CPU), a microprocessor, an application-specific integrated circuit (ASIC), or one or more integrated circuits for controlling the execution of the above operations.

The photographing unit 503 includes a lens unit, a polarize lens, and an image sensor (e.g. CCD). The photographing unit 503 is operated to photograph a subject.

The gyroscope 504 is operated to detect an angle.

The memory 502 may be, but is not limited to a read-only memory (ROM), other types of static memory devices that can store static information and instructions, a random access memory (RAM), other types of dynamic memory devices that can store dynamic information and instructions, an electrically erasable programmable read-only memory (EEPROM), a compact disc read-only memory (CD-ROM), other optical disk memories, a disk (including a compact disc, a laser disc, an optical disk, digital versatile discs, a Blu-ray disc, or the like), a magnetic disk storage media, other magnetic storage devices, or any other media accessed by a computer, which may be operated to carry or store desired application program codes with the form of instructions or data structures. The memory 502 may exist independently, or may be connected with the processor 501 by the bus communication. The memory 502 may be also integrated with the processor 501.

The memory 502 is operated to store application program codes for executing the above scheme by the processor 501. The processor 501 is operated to execute the application program codes stored in the memory 502.

The application program codes stored in the memory 502 may execute the method for adjusting an angle of an element of a photographing unit of the head mounted display, such as determining a rotation angle of a user's head when the user's head rotates; and adjusting an angle of the element of the photographing unit of the head mounted display according to the rotation angle, to align a photographing lens with a subject.

Embodiments of the present disclosure also provide a computer readable storage medium. The computer readable storage medium stores computer programs for electronic data interchange which, when executed, are operable to execute all or part of the operations of any of the method for adjusting an angle of an element of a photographing unit of the head mounted display described in the above-described method embodiment.

It is to be noted that, for the sake of simplicity, the foregoing method embodiments are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the embodiments described in the specification are exemplary embodiments and the actions and modules involved are not necessarily essential to the present disclosure.

In the foregoing embodiments, the description of each embodiment has its own emphasis. For the parts not described in detail in one embodiment, reference may be made to related descriptions in other embodiments.

In the embodiments of the disclosure, the apparatus disclosed in embodiments provided herein may be implemented in other manners. For example, the device/apparatus embodiments described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the embodiments.

In addition, the functional units in various embodiments of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various embodiments of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the embodiments described above may be accomplished by means of a program to instruct associated hardware, the program may be stored in a computer-readable memory, which may include a flash memory, a read-only memory (ROM), a random-access memory (RAM), Disk or compact disc (CD), and so on.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for adjusting an angle of an element of a photographing unit of a head mounted display, wherein the photographing unit is mounted on the head mounted display; the method comprises:
   aligning a photographing lens with a subject when a user's head is stationary;
   determining a rotation angle of the user's head when the user's head rotates; and
   adjusting an angle of the element of the photographing unit of the head mounted display according to the rotation angle, to align the photographing lens with the subject,
   wherein the method further comprises:
   recording an initial parameter of the element of the photographing unit when a photographing tracking mode is initiated;
   the adjusting an angle of the element of the photographing unit of the head mounted display according to the rotation angle, comprises:
   adjusting the angle of the element of the photographing unit according to the initial parameter of the element of the photographing unit and the rotation angle,
   wherein the element of the photographing unit comprises a rotatable lens unit and a polarize lens, the initial parameter of the element of the photographing unit comprises an initial angle of the rotatable lens unit and an initial angle of the polarize lens; and the adjusting the angle of the element of the photographing unit according to the initial parameter of the element of the photographing unit and the rotation angle, comprises:
   rotating the rotatable lens unit at the rotation angle to the direction of the initial angle of the rotatable lens unit, and rotating the polarize lens at half of the rotation angle to the direction of the initial angle of the polarize lens.

2. The method of claim 1, wherein the initial parameter of the element of the photographing unit comprises an initial position of the subject and a characteristic of the subject, and before determining the rotation angle of the user's head, the method further comprises:
   determining whether a position of the subject is changed according to the initial position of the subject and the characteristic of the subject;
   further determining the user's head rotates when the position of the subject is changed.

3. The method of the claim 2, wherein the initial parameter of the element of the photographing unit comprises an initial angle of an optical axis of the photographing unit, and the determining whether the user's head rotates comprises:
   determining a current angle of the optical axis by a gyroscope of the head mounted display;
   determining whether the current angle of the optical axis is consistent with the initial angle of the optical axis; and
   determining the user's head rotates when the current angle of the optical axis is not consistent with the initial angle of the optical axis.

4. The method of claim 1, wherein the photographing unit further comprises an image sensor, the initial parameter of the element of the photographing unit comprises an initial position of the subject and a characteristic of the subject, and the angle of the element of the photographing unit is adjusted according to the rotation angle, the method further comprises:
   acquiring a target image currently captured by the rotatable lens unit by the image sensor;
   determining a current position of the subject according to the characteristic of the subject and the target image;
   adjusting the angle of the element of the photographing unit according to the current position of the subject and the initial position of the subject.

5. The method of the claim 3, wherein determining the current angle of the optical axis by the gyroscope of the head mounted display comprises:
   obtaining an angular velocity by the gyroscope; and
   obtaining a time integral of the angular velocity plus the initial angle of the optical axis as the current angle of the optical axis.

6. The method of the claim 4, wherein adjusting the angle of the element of the photographing unit according to the current position of the subject and the initial position of the subject, comprises:
   determining a moving angle of the subject relative to the initial position according to the current position of the subject and the initial position of the subject;
   rotating the rotatable lens unit at the moving angle to the current position of the subject, and rotating the polarize lens at half of the moving angle to the current position of the subject.

7. A head mounted display, comprising:
   a photographing unit, which is operated to align a photographing lens with a subject when a user's head is stationary; wherein the photographing unit is mounted on the head mounted display; the photographing unit comprises a plurality of elements;
   an angle determining unit operated to determine a rotation angle of the user's head when the user's head rotates; and
   a first adjusting unit operated to adjust an angle of one or more the elements according to the rotation angle, to align the photographing lens with the subject,
   wherein the head mounted display further comprises:
   a recording unit operated to record an initial parameter of one or more the elements of the photographing unit when a photographing tracking mode is initiated, and
   the first adjusting unit further operated to adjust the angle of one or more the elements of the photographing unit according to the initial parameter of one or more the elements of the photographing unit and the rotation angle,
   wherein one or more the elements of the photographing unit comprise a rotatable lens unit and a polarize lens, the initial parameter of one or more the elements of the photographing unit comprises an initial angle of the rotatable lens unit and an initial angle of the polarize lens, and the first adjusting unit is further operated to rotate the rotatable lens unit at the rotation angle to the direction of the initial angle of the rotatable lens unit, and rotate the polarize lens at half of the rotation angle to the direction of the initial angle of the polarize lens.

8. The head mounted display of the claim 7, wherein the initial parameter of one or more the elements of the photographing unit comprises an initial position of the subject and a characteristic of the subject, and the head mounted display further comprises:
a first determining unit operated to determine whether a position of the subject is changed according to the initial position of the subject and the characteristic of the subject;
a second determining unit operated to determine the user's head rotates when the position of the subject is changed, and determine the rotation angle of the user's head when the user's head rotates.

9. The head mounted display of the claim 8, wherein the initial parameter of one or more the elements of the photographing unit comprise an initial angle of an optical axis of the photographing unit, and the second determining unit is further operated to:
determine a current angle of the optical axis by a gyroscope of the head mounted display;
determine whether the current angle of the optical axis is consistent with the initial angle of the optical axis; and
determine the user's head rotates when the current angle of the optical axis is not consistent with the initial angle of the optical axis.

10. The head mounted display of the claim 7, wherein the photographing unit comprises an image sensor, the initial parameter of one or more the elements of the photographing unit comprises an initial position of the subject and a characteristic of the subject, and the head mounted display further comprises:
an image acquiring unit operated to acquire a target image currently captured by the rotatable lens unit by the image sensor;
a position determining unit operated to determine the current position of the subject according to the characteristic of the subject and the target image; and
a second adjusting unit operated to adjust the angle of one or more the elements of the photographing unit according to the current position of the subject and the initial position of the subject.

11. A head mounted display, comprising: a processor, a memory, a photographing unit, and a gyroscope operated to detect an angle, wherein the photographing unit is mounted on the head mounted display; and the processor is operated to perform operations comprising:
aligning a photographing lens with a subject when a user's head is stationary;
determining a rotation angle of the user's head when the user's head rotates; and
adjusting an angle of the element of the photographing unit of the head mounted display according to the rotation angle, to align the photographing lens with the subject,
wherein the processor is operated to perform operations comprising:
recording an initial parameter of the element of the photographing unit when a photographing tracking mode is initiated; and
the adjusting an angle of the element of the photographing unit of the head mounted display according to the rotation angle, comprises:
adjusting the angle of the element of the photographing unit according to the initial parameter of the element of the photographing unit and the rotation angle,
wherein the element of the photographing unit comprises a rotatable lens unit and a polarize lens, the initial parameter of the element of the photographing unit comprises an initial angle of the rotatable lens unit and an initial angle of the polarize lens; and the processor is operated to perform operations comprising:
rotating the rotatable lens unit at the rotation angle to the direction of the initial angle of the rotatable lens unit, and rotating the polarize lens at half of the rotation angle to the direction of the initial angle of the polarize lens.

12. The head mounted display of claim 11, wherein the initial parameter of the element of the photographing unit comprises an initial position of the subject and a characteristic of the subject, and the processor is operated to perform operations comprising:
determining whether a position of the subject is changed according to the initial position of the subject and the characteristic of the subject;
further determining the user's head rotates when the position of the subject is changed.

13. The head mounted display of the claim 12, wherein the initial parameter of the element of the photographing unit comprises an initial angle of an optical axis of the photographing unit, and the processor is operated to perform operations comprising:
determining a current angle of the optical axis by a gyroscope of the head mounted display;
determining whether the current angle of the optical axis is consistent with the initial angle of the optical axis; and
determining the user's head rotates when the current angle of the optical axis is not consistent with the initial angle of the optical axis.

14. The head mounted display of claim 11, wherein the photographing unit further comprises an image sensor, the initial parameter of the element of the photographing unit comprises an initial position of the subject and a characteristic of the subject, and the processor is further operated to perform operations comprising:
acquiring a target image currently captured by the rotatable lens unit by the image sensor;
determining a current position of the subject according to the characteristic of the subject and the target image;
adjusting the angle of the element of the photographing unit according to the current position of the subject and the initial position of the subject.

* * * * *